US012674959B2

(12) United States Patent
Miyoshi et al.

(10) Patent No.: US 12,674,959 B2
(45) Date of Patent: Jul. 7, 2026

(54) VEHICLE DISPLAY DEVICE

(71) Applicant: YAZAKI CORPORATION, Tokyo (JP)

(72) Inventors: Yuki Miyoshi, Makinohara (JP);
Yasuhiro Katsumata, Makinohara (JP);
Akira Yamanaka, Makinohara (JP);
Tetsuya Suganuma, Shimada (JP);
Hiroshi Sano, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 253 days.

(21) Appl. No.: 18/473,193

(22) Filed: Sep. 22, 2023

(65) Prior Publication Data

US 2024/0111128 A1     Apr. 4, 2024

(30) Foreign Application Priority Data

Sep. 29, 2022     (JP) ................................. 2022-155960

(51) Int. Cl.
*G02B 7/182*      (2021.01)
*B60K 35/23*      (2024.01)
*G02B 27/01*      (2006.01)

(52) U.S. Cl.
CPC ......... *G02B 7/182* (2013.01); *G02B 27/0101* (2013.01); *B60K 35/23* (2024.01); *B60K 2360/23* (2024.01)

(58) Field of Classification Search
CPC ........................... G02B 7/182; G02B 27/0101; G02B 27/0149; G02B 5/08; G02B 7/1821; G02B 7/198; G02B 2027/0183; B60K 35/23; B60K 2360/23; B60K 35/00; B60R 11/0229; G09F 9/00
See application file for complete search history.

(56) References Cited

U.S. PATENT DOCUMENTS

2018/0348619 A1*  12/2018  Taniguchi ............... G03B 21/28
2019/0146217 A1*   5/2019  Yamamura ......... G02B 27/0012
                                                       345/7
2022/0291506 A1    9/2022  Miyamoto et al.

FOREIGN PATENT DOCUMENTS

JP         2022-110595 A      7/2022
JP         2022-139310 A      9/2022

* cited by examiner

*Primary Examiner* — Jessica M Merlin
(74) *Attorney, Agent, or Firm* — KENEALY VAIDYA LLP

(57) ABSTRACT

A vehicle display device includes a housing including an opening, an image display device that outputs display light of an image, and a mirror that includes a main body including a reflective surface that reflects the display light toward the opening and is rotatable around a rotation axis. The mirror includes a first and a second ribs that extend along a first direction, and face each other in a second direction. The first rib is formed as a rib closest to a side of the upper end on the back surface, the second rib is formed as a rib closest to a side of the lower end on the back surface, and a central region between the first and the second ribs on the back surface is formed as a flat curved surface, at least a part of which extends from the first rib to the second rib.

5 Claims, 6 Drawing Sheets

VEHICLE DISPLAY DEVICE

CROSS-REFERENCE TO RELATED APPLICATION(S)

The present application claims priority to and incorporates by reference the entire contents of Japanese Patent Application No. 2022-155960 filed in Japan on Sep. 29, 2022.

BACKGROUND OF THE INVENTION

1. Field of the Invention

The present invention relates to a vehicle display device.

2. Description of the Related Art

Conventionally, a vehicle display device is provided with a mirror that reflects display light emitted from an image display device toward a reflective member (such as a windshield) disposed in front of a driver. For example, a vehicle display device of Japanese Patent Application Laid-open No. 2022-110595A includes an emission unit that is mounted on a vehicle and emits display light, a mirror that reflects the display light emitted from the emission unit toward a reflective member, a holding member that holds the mirror, and a rotating mechanism that has a rotating shaft assembled to the holding member and changes a direction of a reflective surface of the mirror held by the holding member by rotating the rotating shaft around an axis.

In the vehicle display device, it is conceivable to provide a rib on a back surface of the mirror in order to increase the rigidity of the mirror. In a configuration in which the rib is provided on the back surface of the mirror, the reflective surface of the mirror may be locally recessed due to the formation of the rib at the time of manufacturing the mirror. The local recess on the reflective surface (in particular, local recess in a central part of the reflective surface) may impair the display quality of a display image. In the vehicle display device, it is desired to improve rigidity of a mirror while maintaining good display quality.

SUMMARY OF THE INVENTION

An object of the present invention is to provide a vehicle display device capable of improving rigidity of a mirror while maintaining good display quality.

In order to achieve the above mentioned object, a vehicle display device according to one aspect of the present invention includes a housing including an opening; an image display device that is provided in the housing and outputs display light of an image; and a mirror that is provided in the housing, includes a main body including a reflective surface that reflects the display light toward the opening, and is rotatable around a rotation axis, wherein the mirror includes a first rib and a second rib, each protruding from a back surface that is a surface of the main body opposite to the reflective surface and extending along a first direction along the rotation axis on the back surface, the first rib and the second rib facing each other in a second direction orthogonal to the first direction, the back surface includes an upper end that is an end closer to the opening in the second direction and a lower end that is an end farther from the opening in the second direction, the first rib is formed as a rib closest to a side of the upper end on the back surface, the second rib is formed as a rib closest to a side of the lower end on the back surface, and a central region between the first rib and the second rib on the back surface is formed as a flat curved surface, at least a part of which extends from the first rib to the second rib.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic configuration diagram illustrating a vehicle display device according to an embodiment;

FIG. 2 is a schematic configuration diagram illustrating the vehicle display device according to the embodiment;

FIG. 4 is a partially enlarged cross-sectional view illustrating the mirror of the vehicle display device according to the embodiment;

FIG. 5 is a schematic configuration diagram illustrating the vehicle display device according to the embodiment.

DETAILED DESCRIPTION OF THE PREFERRED EMBODIMENTS

Hereinafter, a vehicle display device according to an embodiment of the present invention will be described in detail with reference to the drawings. Note that the present invention is not limited by the embodiment. Furthermore, constituent elements in the following embodiment includes those that can be easily assumed by those skilled in the art or those that are substantially the same.

Embodiment

Figure 1:
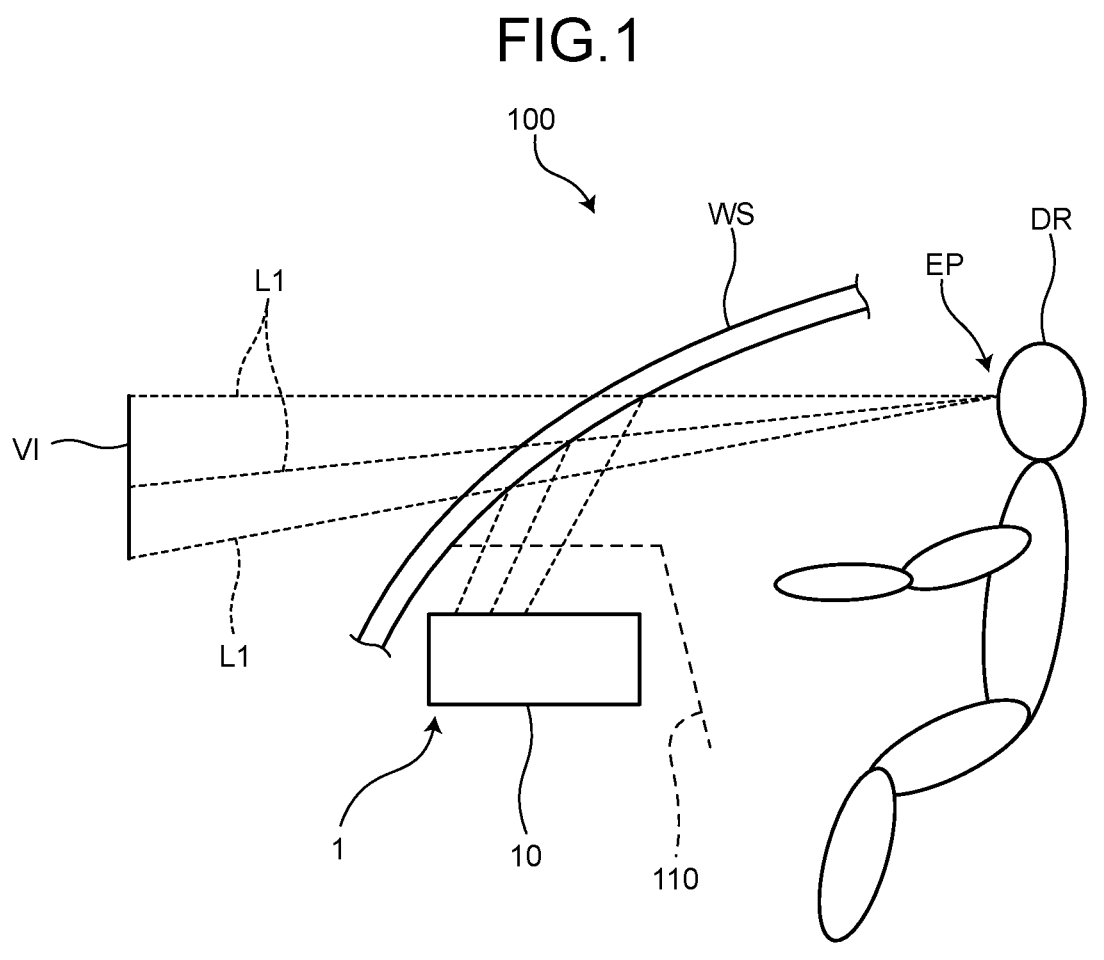
Figure 2:
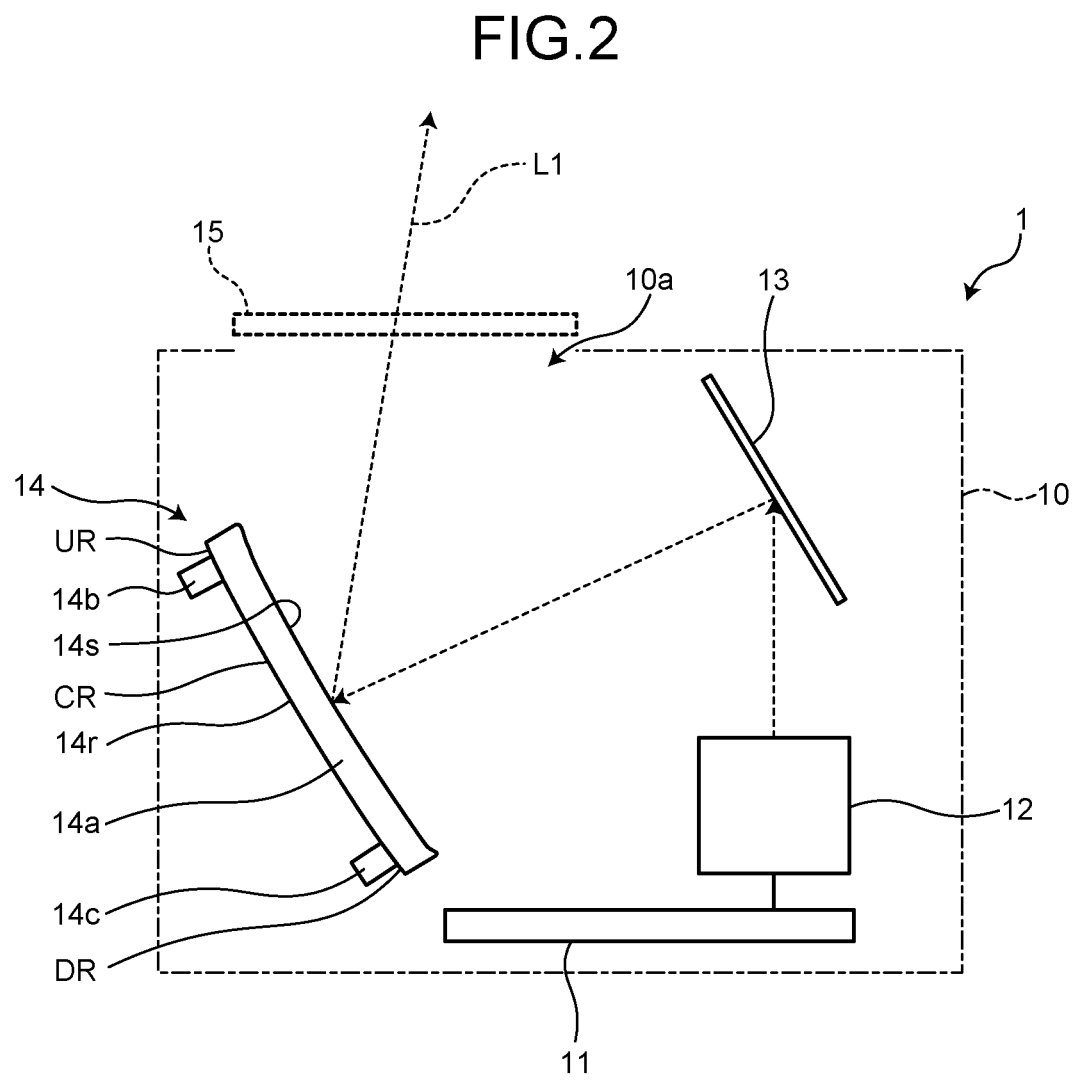
Figure 3:
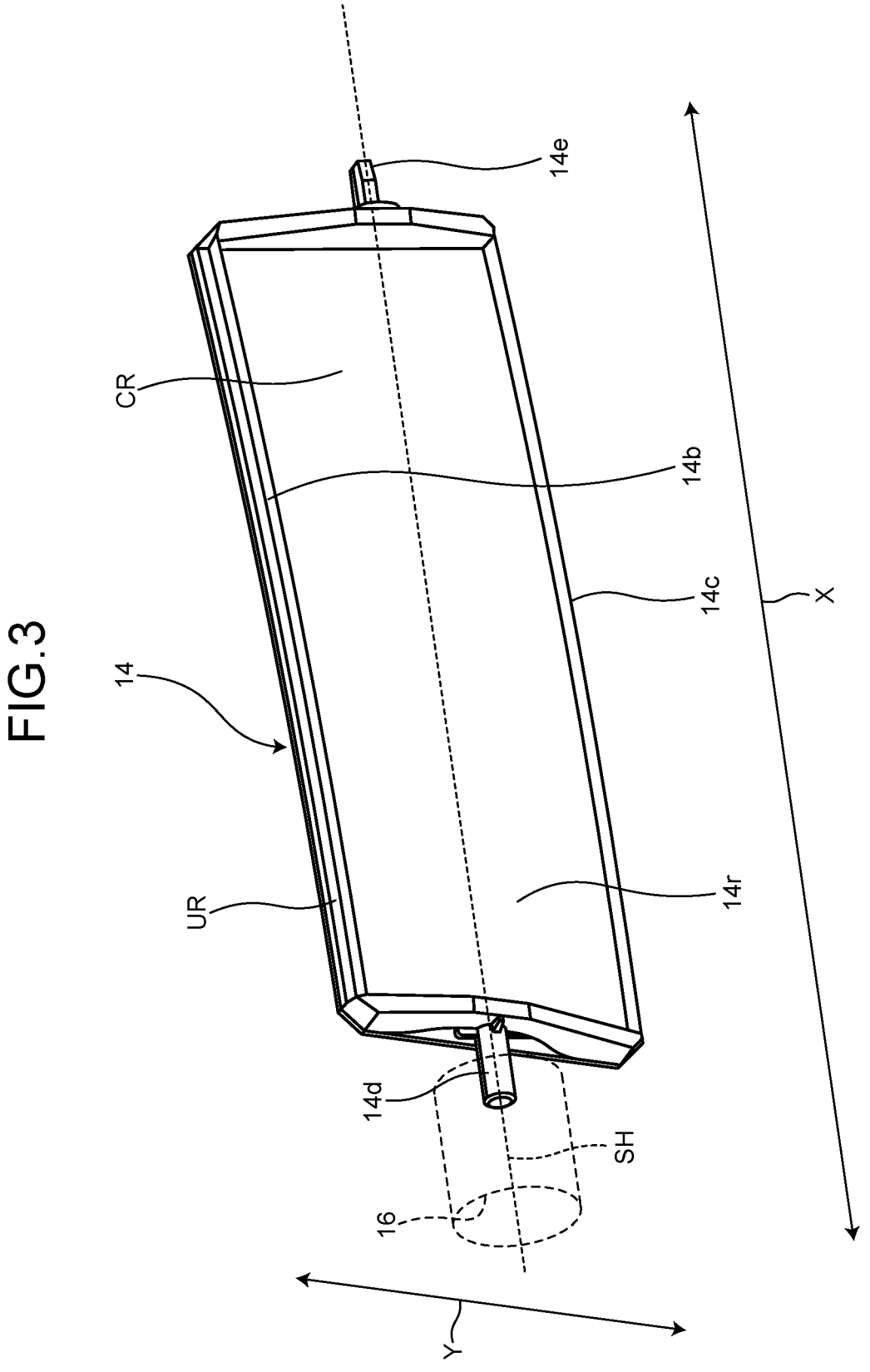
FIG. 3 is a perspective view illustrating a mirror of the vehicle display device according to the embodiment.
Figure 4:
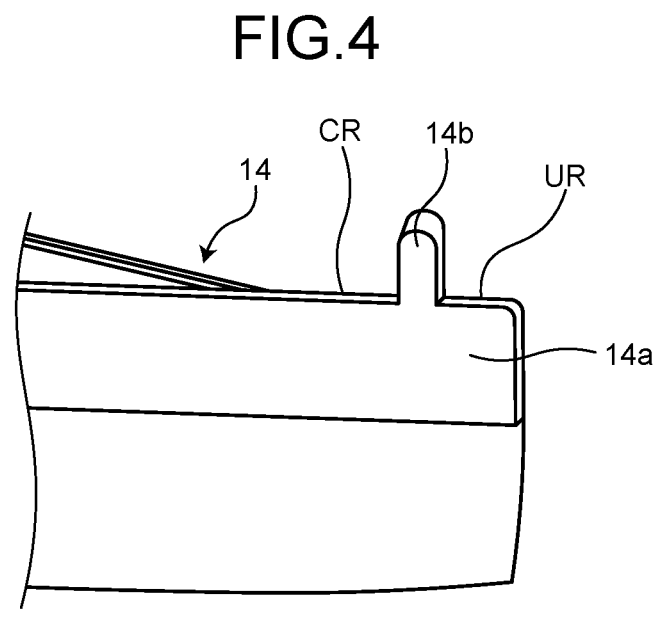
Figure 5:
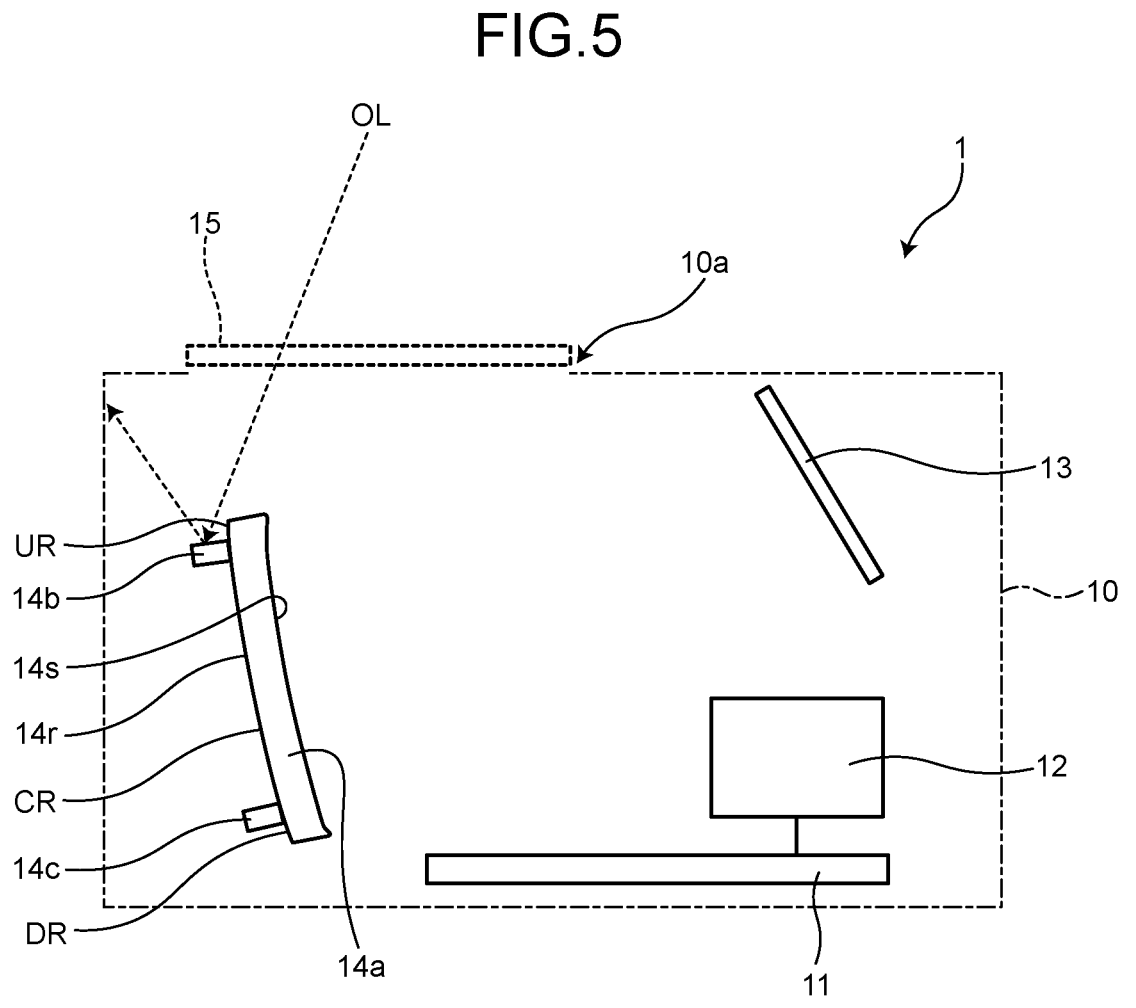

An embodiment will be described with reference to FIGS. 1 to 5. An embodiment described herein relate generally to a vehicle display device. FIG. 1 is a schematic configuration diagram illustrating a vehicle display device according to an embodiment, FIG. 2 is a schematic configuration diagram illustrating the vehicle display device according to the embodiment, FIG. 3 is a perspective view illustrating a mirror of the vehicle display device according to the embodiment, FIG. 4 is a partially enlarged cross-sectional view illustrating the mirror of the vehicle display device according to the embodiment, and FIG. 5 is a schematic configuration diagram illustrating the vehicle display device according to the embodiment. FIG. 4 is a partially enlarged cross-sectional view illustrating a cross section around a first rib in the mirror.

As illustrated in FIG. 1, a vehicle display device 1 is a head-up display device mounted on a vehicle 100 such as an automobile. The vehicle display device 1 projects display light L1 of an image toward a windshield WS. The windshield WS is located in front of the vehicle with respect to an eye point EP of a driver DR in the vehicle 100, and faces the eye point EP in a vehicle front-rear direction. The display light L1 is reflected by the windshield WS toward the eye point EP. The driver DR of the vehicle 100 can visually recognize a virtual image VI by the display light L1 reflected by the windshield WS.

The vehicle display device 1 according to the embodiment can change a projection position of an image on the windshield WS in a vertical direction. For example, the vehicle display device 1 moves the projection position of the image with respect to the windshield WS up and down based on a position of the eye point EP. The eye point EP is an eye position of the driver DR, and is detected using, for example, a camera or the like provided in the vehicle 100. The illustrated camera is disposed in front of the vehicle with respect to the driver's seat and is installed so as to be able to image the driver DR. The eye point EP is detected by image recognition on the image generated by the camera.

As illustrated in FIG. 2, the vehicle display device 1 according to the embodiment includes a housing 10, a controller 11, an image display device 12, a reflective member 13, a mirror 14, and a cover member 15. The housing 10 is disposed inside an instrument panel 110, for example. The housing 10 includes an opening 10a facing the windshield WS. The controller 11, the image display device 12, the reflective member 13, and the mirror 14 are accommodated in the housing 10. The cover member 15 is a light transmissive member that transmits at least the display light L1 emitted from the image display device 12, and is provided so as to cover the opening 10a of the housing 10.

The controller 11 controls the image display device 12 to perform display control of a display image (virtual image VI) displayed by the vehicle display device 1. The image display device 12 outputs a display image projected on the windshield WS as the display light L1. The image display device 12 includes a liquid crystal display unit and a backlight unit. The liquid crystal display unit is a so-called liquid crystal panel, and is made of, for example, a light transmission type or a light semi-transmission type thin film transistor liquid crystal display (TFT liquid crystal display) or the like. In the liquid crystal display unit, a display surface on a side of a front surface emits light by being illuminated from a side of a back surface. The backlight unit illuminates the liquid crystal display unit from the side of the back surface. In the embodiment, the backlight unit is disposed opposite to the reflective member 13. The backlight unit is driven by, for example, electric power obtained from a battery (not illustrated) in the vehicle 100.

The reflective member 13 includes a flat reflective surface that reflects the display light L1, and is disposed at a position facing the image display device 12. The reflective member 13 of the embodiment is a flat mirror. The reflective member 13 reflects the display light L1 emitted from the image display device 12 toward the mirror 14.

The mirror 14 reflects the display light L1 reflected by reflective member 13 toward the windshield WS through the opening 10a. The mirror 14 of the embodiment is a concave mirror and has a function as a magnifying mirror. That is, the mirror 14 of the embodiment enlarges and reflects a display image such that the display image represented by the display light L1 after being reflected by the concave mirror 14 becomes relatively larger than the display image represented by the display light L1 before being reflected by the mirror 14.

The mirror 14 includes a main body 14a and rotating shafts 14d and 14e (see FIG. 3). The main body 14a includes a reflective surface 14s that reflects the display light L1. As illustrated in FIG. 3, the rotating shafts 14d and 14e are disposed at positions of a rotation axis SH. The rotation axis SH is a rotation center of the mirror 14. Central axes of the rotating shafts 14d and 14e are on the rotation axis SH. In the embodiment, the main body 14a is a substantially rectangular flat-plate-like member whose longitudinal direction is a first direction X along the rotation axis SH when viewed from a thickness direction of the main body 14a. The rotating shaft 14d is disposed on one end surface (first side surface) in the longitudinal direction (first direction X) of the main body 14a, and the rotating shaft 14e is disposed on the other end surface (second side surface) in the longitudinal direction (first direction X) of the main body 14a. In the embodiment, a first side wall and a second side wall protruding from a surface (back surface 14r) opposite to the reflective surface 14s are provided at both ends in the longitudinal direction (first direction X) of the main body 14a. Here, the first side surface is a surface of the first side wall on a side opposite to a surface on the second side wall side, and the second side surface is a surface of the second side wall on a side opposite to the surface on the first side wall side. The rotating shaft 14d is formed to protrude from the first side surface. The rotating shaft 14e is formed to protrude from the second side surface. For example, the rotating shafts 14d and 14e each have a substantially cylindrical shape.

As illustrated in FIG. 2, the reflective surface 14s is formed of a concave curved surface and disposed at a position facing the reflective member 13. The mirror 14 of the embodiment is rotatably provided around the rotation axis SH. The vehicle display device 1 according to the embodiment further includes a drive unit 16 that rotates the mirror 14 around the rotation axis SH. As illustrated in FIG. 3, the rotating shaft 14d of the mirror 14 of the embodiment is connected to the drive unit 16. The drive unit 16 is supported by the housing 10. Furthermore, for example, the rotating shaft 14e is inserted into an opening (not illustrated) formed in the housing 10. With this configuration, the mirror 14 is rotatably supported with respect to the housing 10. The drive unit 16 includes a motor, and transmits an output of the motor to the rotating shaft 14d to rotate the mirror 14 around the rotation axis SH. The drive unit 16 can change a reflection angle of the display light L1 by rotating the mirror 14. For example, the controller 11 is also configured to be able to control the drive unit 16, and can raise and lower a projection position of an image with respect to the windshield WS by rotating the mirror 14 on the basis of the position of the eye point EP detected by the above-described camera or the like.

The mirror 14 includes the back surface 14r that is a surface opposite to the reflective surface 14s. The back surface 14r includes an upper end that is an end closer to the opening 10a in the second direction Y orthogonal to the first direction X along the rotation axis SH, and a lower end that is an end farther from the opening 10a in the second direction Y.

As illustrated in FIGS. 2 to 4, the mirror 14 includes a first rib 14b and a second rib 14c protruding from the back surface 14r. The first rib 14b and the second rib 14c are provided, for example, for the purpose of increasing the rigidity of the mirror 14. The first rib 14b is formed as a rib closest to a side of the upper end on the back surface 14r, and the second rib 14c is formed as a rib closest to a side of the lower end on the back surface 14r. In the embodiment, the first rib 14b is disposed near the upper end of the back surface 14r, and the second rib 14c is disposed near the lower end of the back surface 14r.

The first rib 14b is formed along the upper end of the back surface 14r, and the second rib 14c is formed along the lower end of the back surface 14r. On the back surface 14r, the first rib 14b and the second rib 14c extend along the first direction X. In the embodiment, the first rib 14b and the second rib 14c are formed so as to cross from the first side wall to the second side wall of the main body 14a along the first direction X.

A central region CR between the first rib 14b and the second rib 14c on the back surface 14r is formed as a flat curved surface, at least a part of which extends from the first rib 14b to the second rib 14c. That is, in the embodiment, the central region CR is not provided with a rib that traverses the back surface 14r from the first side wall to the second side wall of the main body 14a along the first direction X.

An upper end side region UR is provided between the upper end of the back surface 14r and the first rib 14b. On the back surface 14r, the upper end side region UR is formed as a flat curved surface extending from the first rib 14b to the upper end of the back surface 14r. That is, the first rib 14b is formed at a distance from the back surface 14r in the vicinity of the upper end of the back surface 14r.

A lower end side region DR is provided between the lower end of the back surface 14r and the second rib 14c. On the back surface 14r, the lower end side region DR is formed as a flat curved surface extending from the second rib 14c to the lower end of the back surface 14r. That is, the second rib 14c is formed at a distance from the back surface 14r in the vicinity of the lower end of the back surface 14r.

That is, on the back surface 14r of the mirror 14 of the embodiment, a rib formed so as to cross the back surface 14r is not provided in the region (upper end side region UR) on the side of the upper end of the first rib 14b and the region (lower end side region DR) on the side of the lower end of the second rib 14c.

In the vehicle display device, outside light OL such as sunlight may enter the inside of the housing from the opening of the housing. At this time, the outside light OL incident on the housing is reflected by the rib of the mirror and emitted from the opening toward the windshield, which may affect the display quality of the vehicle display device 1. Therefore, the mirror 14 of the embodiment is preferably disposed at a position where the outside light OL is hardly emitted from the opening 10a even in a case where the outside light OL is reflected by the first rib 14b. In the embodiment, as illustrated in FIG. 5, the mirror 14 is disposed so that the outside light is reflected toward a place other than the opening 10a in the housing 10 even in a case where the outside light OL is reflected by the first rib 14b. Furthermore, in the embodiment, by providing the upper end side region UR between the first rib 14b and the upper end of the back surface 14r, the first rib 14b is separated from the upper end of the back surface 14r, and the outside light is prevented from entering the first rib 14b. With this configuration, the outside light OL reflected by the first rib 14b can be suppressed from being reflected in the display image.

The central region CR is a region that occupies most of the back surface 14r, and is set to be wider than the upper end side region UR and the lower end side region DR. In the mirror 14, the main body 14a and the rotating shafts 14d and 14e are integrally formed of synthetic resin. The reflective surface 14s of the main body 14a is provided by forming a reflective layer on the surface of the main body 14a by vapor deposition or the like. In a case where the mirror 14 is formed of a synthetic resin, when a rib is locked to the back surface 14r of the mirror 14, there is a difference in shrinkage rate when the synthetic resin is solidified between a portion where the rib exists and a portion where the rib does not exist. Due to this difference in shrinkage rate, the portion of the reflective surface 14s located on a back side of the rib may be locally recessed toward a side of the back surface 14r. That is, a local recess (so-called sink mark) due to the formation of the rib may be formed on the reflective surface 14s. The recess of the reflective surface 14s may affect the display quality of the vehicle display device 1. In particular, in a case where the recess is formed in a central part of the reflective surface 14s, there is a high possibility that the display quality of the vehicle display device 1 is impaired.

In the embodiment, the first rib 14b is formed near the upper end of the back surface 14r, the second rib 14c is formed near the lower end of the back surface 14r, and the central region CR is formed as a flat curved surface extending from the first rib 14b to the second rib 14c. With this configuration, it is possible to suppress formation of a recess in the central portion of the reflective surface 14s.

As described above, the vehicle display device 1 according to the embodiment includes the housing 10 including the opening 10a, the image display device 12 that is provided in the housing 10 and outputs the display light L1 of an image, and the mirror 14 that is provided in the housing 10, includes the main body 14a including the reflective surface 14s that reflects the display light L1 toward the opening 10a, and is rotatable around the rotation axis SH. The mirror 14 includes the first rib 14b and the second rib 14c, each protruding from the back surface 14r that is a surface of the main body 14a opposite to the reflective surface 14s and extending along the first direction X along the rotation axis SH on the back surface 14r, the first rib 14b and the second rib 14c facing each other in the second direction Y orthogonal to the first direction X. The back surface 14r includes an upper end that is an end closer to the opening 10a in the second direction Y, and a lower end that is an end farther from the opening 10a in the second direction Y. The first rib 14b is formed as a rib closest to a side of the upper end on the back surface 14r, and the second rib 14c is formed as a rib closest to a side of the lower end on the back surface 14r. The central region CR between the first rib 14b and the second rib 14c on the back surface 14r is formed as a flat curved surface, at least a part of which extends from the first rib 14b to the second rib 14c.

In the vehicle display device 1 according to the embodiment, at least a part of the central region CR on the back surface 14r of the mirror 14 is formed as a flat curved surface extending from the first rib 14b to the second rib 14c. That is, in the vehicle display device 1 of the embodiment, a rib crossing the central region CR of the mirror 14 in the first direction X is not formed. With this configuration, it is possible to suppress the recess of the reflective surface 14s due to the formation of the rib at the central part of the reflective surface 14s having a large influence on the display image. Therefore, the rigidity of the mirror 14 can be improved by the first rib 14b and the second rib 14c while the good display quality of the vehicle display device 1 is maintained.

Furthermore, in the vehicle display device 1 according to the embodiment, the upper end side region UR formed as a flat curved surface extending from the first rib 14b to the upper end of the back surface 14r is provided between the upper end of the back surface 14r and the first rib 14b.

By separating the first rib 14b from the upper end of the back surface 14r, the first rib 14b can be moved away from the opening 10a. With this configuration, it is possible to suppress the outside light OL incident from the opening 10a from being reflected by the first rib 14b and affecting the display quality.

Modified Example of Embodiment

Figure 6:
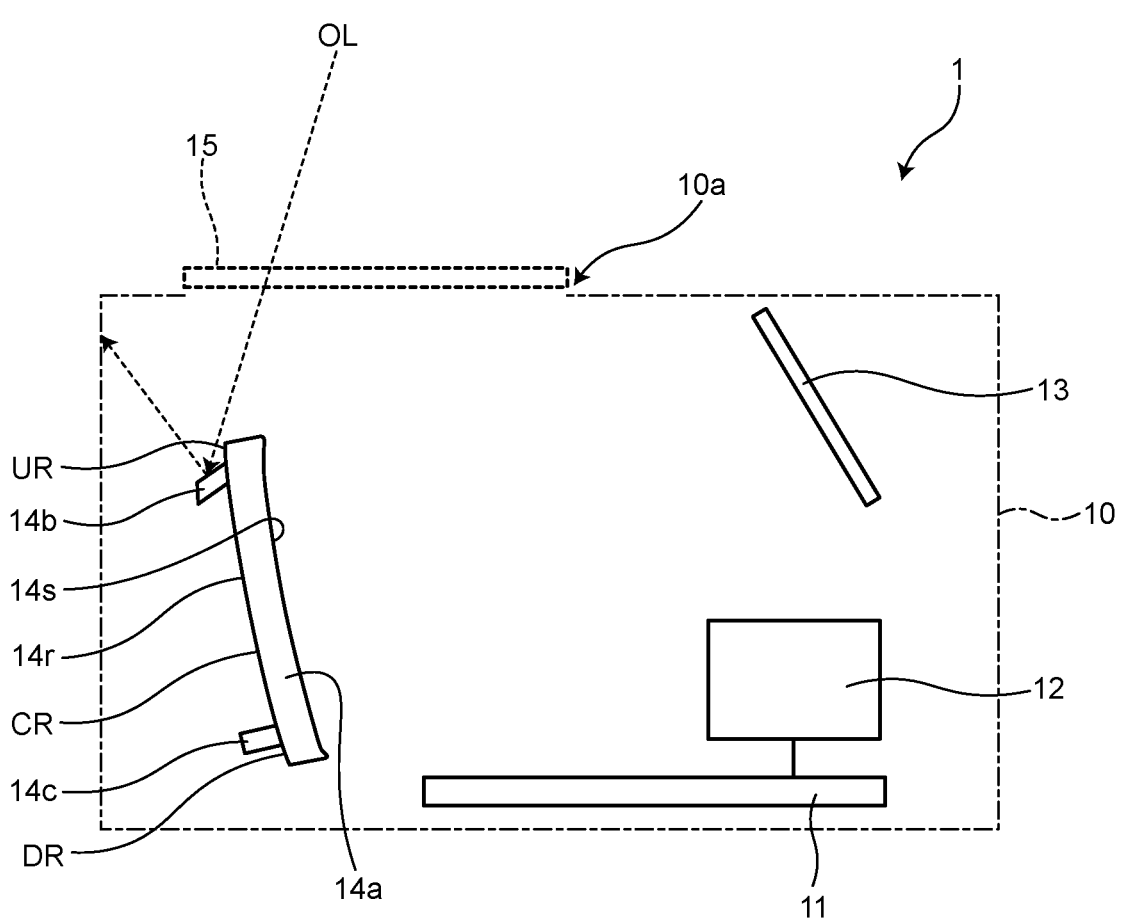
FIG. 6 is a schematic configuration diagram illustrating a vehicle display device according to a modified example.

Next, a modified example of the embodiment will be described with reference to FIG. 6. FIG. 6 is a schematic configuration diagram illustrating a vehicle display device according to a modified example. A vehicle display device 1 according to the modified example is different from the above-described embodiment in that a first rib 14*b* is inclined from a proximal end side to a distal end side toward the side of the lower end in the second direction Y.

As illustrated in FIG. 6, in the modified example, in the second direction Y, a surface of the first rib 14*b* on a side of the opening 10*a* (an upper surface of the first rib 14*b*) is inclined so as to be closer to the lower end of the back surface 14*r* toward the distal end side of the first rib 14*b*. That is, the first rib 14*b* is formed such that an angle R1 formed by the surface of the first rib 14*b* on the side of the opening 10*a* and the upper end side region UR is an obtuse angle. The angle R1 formed by the first rib 14*b* and the upper end side region UR is set such that the outside light OL incident from the opening 10*a* and reaching the upper surface of the first rib 14*b* is reflected by the upper surface of the first rib 14*b* to a place other than the opening 10*a*. For example, the angle R1 formed by the first rib 14*b* and the upper end side region UR is set such that the outside light OL entering from the opening 10*a* and reaching the upper surface of the first rib 14*b* is reflected by an inner wall of the housing 10 located on an opposite side of the image display device 12 with respect to the opening 10*a*.

In the vehicle display device 1 according to the modified example, an area of the upper surface of the first rib 14*b* viewed from the side of the opening 10*a* is smaller than that of the configuration in which the upper surface of the first rib 14*b* is not inclined. With this configuration, the outside light OL incident on the inside of the housing 10 from the opening 10*a* can be suppressed from reaching the upper surface of the first rib 14*b*. Furthermore, even if the outside light OL incident on the inside of the housing 10 from the opening 10*a* reaches the upper surface of the first rib 14*b*, the outside light OL is reflected at a location different from the opening 10*a* since the upper surface of the first rib 14*b* is inclined. Therefore, it is possible to suppress the outside light OL from affecting the display quality of the vehicle display device 1.

As described above, in the vehicle display device 1 according to the modified example, the surface of the first rib 14*b* on the side of the opening 10*a* is inclined so as to be closer to the lower end toward the distal end side of the first rib 14*b* in the second direction Y.

In the vehicle display device 1 according to the modified example, by inclining the surface of the first rib 14*b* on the side of the opening 10*a*, the outside light OL incident from the opening 10*a* can be suppressed from being reflected by the first rib 14*b* toward the opening 10*a*.

Note that, in the above embodiment and modified example, the configuration in which the upper end side region UR and the lower end side region DR are provided on the back surface 14*r* has been described, but the upper end side region UR and the lower end side region DR may not be provided on the back surface 14*r*. That is, the first rib 14*b* may be formed at the upper end of the back surface 14*r*, and the second rib 14*c* may be formed at the lower end of the back surface 14*r*. For example, by forming the first rib 14*b* at the upper end of the back surface 14*r* and forming the second rib 14*c* at the lower end of the back surface 14*r*, the position of the recess of the reflective surface 14*s* due to the formation of the rib can be moved away from the central part of the reflective surface 14*s*. With this configuration, it is possible to suppress deterioration of the display quality of the vehicle display device 1.

Furthermore, in the above embodiment and modified example, at least one of the first rib 14*b* and the second rib 14*c* may have one or more notch portions. For example, a protruding portion of the first rib 14*b* with respect to the back surface 14*r* may be divided by the notch portion in the first direction X. Furthermore, a protrusion height of the first rib 14*b* may be partially lowered by the notch portion. For example, a notch portion may be provided at the central portion of the first rib 14*b* in the second direction Y.

Similarly, for example, a protruding portion of the second rib 14*c* with respect to the back surface 14*r* may be divided by a notch portion in the first direction X. Furthermore, a protrusion height of the second rib 14*c* may be formed to be partially low by the notch portion. For example, a notch portion may be provided at the central portion of the second rib 14*c* in the second direction Y. Since at least one of the first rib 14*b* and the second rib 14*c* includes one or more notch portions, for example, when the mirror 14 rotates, it is possible to suppress the mirror 14 from interfering with the housing 10 or another member (not illustrated) accommodated in the housing 10.

Furthermore, in the above embodiment and modified example, the configuration in which the reflective member 13 is provided in the vehicle display device 1 has been described, but the reflective member 13 may not be provided. In this case, for example, the display light L1 emitted from the image display device 12 directly enters the mirror 14.

Furthermore, on the back surface 14*r*, only one of the upper end side region UR and the lower end side region DR may be provided. For example, only upper end side region UR of the upper end side region UR and the lower end side region DR may be provided on the back surface 14*r*.

Furthermore, a rib (third rib) extending in the second direction Y may be provided in the central region CR. Here, the third rib is preferably formed at a position close to the first side wall or the second side wall in the second direction Y. That is, it is preferable to dispose the rib at a position as far as possible from the center of the central region CR due to the formation of the rib.

Furthermore, in the above embodiment and modified example, the configuration in which the reflective member 13 is provided in the vehicle display device 1 has been described, but the reflective member 13 may not be provided. In this case, for example, the display light L1 emitted from the image display device 12 directly enters the mirror 14.

The contents disclosed in the above embodiment and modified example can be appropriately combined and executed.

The vehicle display device according to the present embodiment has an effect of improving the rigidity of the mirror while maintaining good display quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
a housing including an opening;
an image display device that is provided in the housing and outputs display light of an image; and
a mirror that is provided in the housing, includes a main body including a reflective surface that reflects the display light toward the opening, and is rotatable around a rotation axis, wherein the mirror includes a first rib and a second rib, each protruding from a back surface that is a surface of the main body opposite to the reflective surface and extending along a first direction along the rotation axis on the back surface, the first rib and the second rib facing each other in a second direction orthogonal to the first direction, the back surface includes an upper end that is an end closer to the opening in the second direction and a lower end that is an end farther from the opening in the second direction, the first rib is formed as a rib closest to a side of the upper end on the back surface, the second rib is formed as a rib closest to a side of the lower end on the back surface, a central region between the first rib and the second rib on the back surface is formed as a curved surface, at least a part of which extends from the first rib to the second rib, and the mirror further including a first end and a second end spaced away from the first end in the first direction, the first rib extending from the first end to the second end.

2. The vehicle display device according to claim 1, wherein an upper end side region formed as a curved surface extending from the first rib to the upper end is provided between the upper end and the first rib on the back surface.

3. The vehicle display device according to claim 1, wherein in the second direction, a surface of the first rib on a side of the opening is inclined so as to be closer to the lower end toward a distal end side of the first rib.

4. The vehicle display device according to claim 2, wherein in the second direction, a surface of the first rib on a side of the opening is inclined so as to be closer to the lower end toward a distal end side of the first rib.

5. The vehicle display device according to claim 2, wherein a lower end side region formed as a curved surface extending from the second rib to the lower end is provided between the lower end and the second rib on the back surface.

* * * * *